3,013,946
SPORE COMPOSITION AND PROCESS OF PREPARING SAME

Melvyn Lumb and George D. Wilkin, Nottingham, England, assignors to Boots Pure Drug Company Limited, Nottingham, England, a British company
No Drawing. Filed Apr. 24, 1959, Ser. No. 808,580
14 Claims. (Cl. 195—54)

This invention relates to improvements in the method of preparation of fungi, in particular, organisms of the class consisting of predacious Moniliaceae.

In British specification No. 800,736 there is described a method for the cultivation of an organism of the class consisting of predacious Moniliaceae in deep culture in a fermentation medium containing nutrients essential to the growth of the organism. There are also described methods by which the organisms of the above class can be used to control eelworm in soil infested with potato, sugar beet and pea root eelworm. These methods consist in applying dried or moist mycelial growth mixed with a suitable organic carrier to the surface of the soil followed by a suitable method of dispersal thoroughout the topsoil. The use of mycelial growth for the treatment of eelworm in soil, while effecting is subject to a number of disadvantages. Thus the material contains only a relatively small proportion of viable spores. If the material is employed in the moist state it is necessary to apply it to soil within a very short time of harvesting from the fermentation otherwise extensive decomposition occurs. The material in the moist state is therefore totally unsuitable for marketing as a commercial product. This particular difficulty can be overcome by extensive drying but such a process is extremely expensive and the dry product still contains only a relatively small proportion of viable spores.

In British specification No. 800,736 there are also described methods for the propagation of the organisms of the above class in deep culture fermentation whereby a very high concentration of spores is obtained in the final product. The product from such fermentations can be readily dried to yield a free flowing solid which may be mixed with solid diluents in order to facilitate the application of the fungi to the soil for the control of eelworms.

It is an object of the present invention to provide a process for the preparation of a material containing a high concentration of viable spores in intimate association with a solid inert carrier which process does not involve the handling of large quantities of liquid and the elaborate operations which are involved in deep culture fermentation. We have found that we can achieve this object by using a form of surface culture which is adapted for use on the large scale.

Surface culture methods well-known in the art can be employed for the propagation of organisms of the class consisting of predacious Moniliaceae but these methods employ media such as those containing agar, gelatine etc., and suffer from serious disadvantages. Firstly, the surface area available for growth is small and secondly, the collection of the spore containing material is both tedious and costly so that such a method cannot be used economically on the large scale.

We have now found that the propagation of organisms consisting of the class of predacious Moniliaceae may be carried out in a fermentation medium containing the nutrients essential for the growth of the organism and supported on a solid carrier presenting a very large surface area. A project of high spore concentration is thereby produced which can be readily dried and ground to a free flowing powder suitable for use in the control of eelworm in soil. The method can be adapted readily for large scale commercial working as will be evident from the more detailed description given below.

Accordingly our invention consists in a process for the preparation of a composition suitable for the control of eelworm infested soils and containing a high concentration of viable spores, which comprises propagating an organism of the class consisting of predacious Moniliaceae in a liquid fermentation medium containing the nutrients essential for the growth of the organism and supported on a solid carrier of high surface area as hereinbefore defined, followed by desiccation of the resulting product.

The organisms of the above class to which the process of the invention may be applied includes the following:

Arthrobotrys robusta Duddington.
Arthrobotrys cladodes Dreschler.
Arthrobotrys conoides Dreschler.
Trichothecium flagrans Duddington.
Cylindrocarpon radicicola Wollenweber.

The carriers which may be employed in the process of the invention are solids which possess a very high surface area and fall into the following catagories. Thus the carriers may be completely inert and take no part in the actual metabolism of the growing organism. Examples of this type are pumice, vermiculite, or asbestos wool. Alternatively solid organic carriers may be used which may subsequently supply essential nutrients for the growth of the mycelium when the preparation is applied to eelworm infested soil. Such carriers are exemplified by granulated peat, wool fibres etc. We have found vermiculite to be a particularly useful carrier because of its high surface area, the ease with which it may be pulverised and because it is itself widely used in the treatment of soil.

The fermentation media which are suitable for the purpose of the invention may contain any of the available organic sources of nitrogen but we have found that whey powder is a particularly useful source. The proportion of whey powder may vary but is preferably of the order of 2.8 parts per 100 ml. There must also be present in the medium sources of carbon and hydrogen, which sources may include carbohydrates, for example, lactose, corn steep liquor etc. The proportions of these nutrients may vary over a fairly wide range but a medium which has been found to be particularly valuable has the following composition, the proportions being expressed as grams per 100 ml. of medium:

| | Parts |
|---|---|
| Whey powder | 2.8 |
| Lactose | 3.4 |
| Potassium dihydrogen phosphate | 0.4 |
| Corn steep liquor | 0.38 |

The propagation of the organism according to the invention may be initiated in a variety of ways. Thus a suitable weight of the carrier material, for example, dry vermiculite is charged into a fermentation vessel and the vessel and contents are sterilised by steam, or other suitable means. A vegetative mycelial growth of the required predacious fungus is added to the medium hereinbefore described and the inoculated medium is added in a suitable proportion to the sterile carrier. We have found that a proportion of 2 ml. of inoculum per gram of carrier gives particularly valuable results. Alternatively the carrier hereinbefore described, may be moistened with a suitable proportion of the uninoculated fermentation medium, preferably in a proportion of 2 ml. of medium per gram of carrier. The mixture is then charged into the fermentation vessel and is sterilised as before. The carrier-borne medium is then inoculated by aseptic transfer, for example, by spraying, of a suspension of spores of the required organism.

Inoculation is followed by the growing period of the organism when mycelial growth spreads throughout the interstices of the carrier material, during which period the temperature may be between 20° C. and 30° C. but is preferably between 24° C. and 28° C. The organism will grow satisfactorily under static conditions but it is preferable to agitate the fermenter contents, for example by rotation of the fermenter.

The fermentation is continued for a period of up to 14 to 21 days and the spongy contents of the fermenter are dried by warm air or in a vacuum drier. We prefer to carry out the drying operation in the actual fermenter. When the process for the invention is carried out on the large scale it is preferable to employ a cylindrical fermentation vessel which can be rotated about its longitudinal axis, the latter being horizontal or slightly inclined to the horizontal. The contents of the vessel may be stirred continuously by rotation of the vessel during the fermentation and may be aerated if necessary by passage of a stream of moist air. When the fermentation has ended the product may be dried in situ by passage of a stream of warm air through the vessel whilst the latter is rotated.

The dried material, which is free flowing, may be ground if desired and used alone or together with an organic adjuvant, for example, bran, for application to eelworm infested soil. The nature of the product makes it eminently suitable for application by drilling either when the seed is drilled into the ground or at some other time.

The invention is illustrated by the following nonlimitative examples.

Example 1

A culture of the required predacious fungus is grown under submerged conditions and one part by volume of the vegetative mycelium is added to four parts of a sterile fermentation medium containing:

| | Percent |
|---|---|
| Whey powder | 2.8 |
| Lactose | 3.4 |
| Potassium dihydrogen phosphate | 0.4 |
| Corn steep liquor solids | 0.38 |
| Water | to 100 |

Sufficient sodium hydroxide solution to adjust the pH to between the limits of 6.8 and 7.0.

A 500 ml. conical flask containing 5 gm. of vermiculite is sterilised and 10 ml. of the above inoculated medium is added. The vessel is incubated at a temperature of 24° to 28° C. for a period of 14 to 21 days until the mycelium has grown throughout the vermiculite carrier. The fermentation vessel is then placed in a vacuum drier to give an easily handled product.

Example 2

A thomson bottle containing 75 gm. of vermiculite is sterilised and 150 ml. of an inoculated medium hereinbefore described is added. The vessel is incubated at a temperature of 24° to 28 C. for a period of 14 to 21 days as described in Example 1. The carrier containing the mycelial growth is removed from the vessel and is dried in a thin layer in a current of warm air at a temperature of 25° to 30° C. to give an easily handled product.

We claim:
1. A process for the preparation of a composition suitable for the control of eelworm infested soil and containing a high concentration of viable spores which comprises propagating an organism of the class consisting of predacious Moniliaceae in a liquid fermentation medium containing the nutrient essential for the growth of the organism and supported on vermiculite followed by desiccation of the resulting product.

2. A process as claimed in claim 1, wherein the microorganism is chosen from the group:

*Arthrobotrys robusta* Duddington.
*Arthrobotrys cladodes* Dreschler.
*Arthrobotrys conoides* Dreschler.
*Trichothecium flagrans* Duddington.
*Cylindrocarpon radicicola* Wollenweber.

3. A process as claimed in claim 1, wherein the liquid fermentation medium contains an organic source of nitrogen.

4. A process as claimed in claim 3, wherein the source of nitrogen is whey powder.

5. A process as claimed in claim 4, wherein the whey powder is present at a concentration of about 2.8 grams per 100 millilitres of fermentation medium.

6. A process as claimed in claim 1, which comprises adding a vegetative mycelium growth of the appropriate predacious fungus to the fermentation medium and adding the inoculum to the vermiculite at a rate of 2 ml. of inoculum per gram of vermiculate.

7. A process as claimed in claim 1, which comprises adding the fermentation medium to the vermiculite at a rate of 2 ml. of medium per gram of vermiculite and subsequently inoculating the vermiculite-borne medium.

8. A process as claimed in claim 1, wherein the fermentation is carried out at a temperature of between 20° C. and 30° C.

9. A process as claimed in claim 8, wherein the fermentation is carried out at a temperature between 24 to 28° C.

10. A process as claimed in claim 1, wherein the fermentation is carried out for a period of from 14 to 21 days.

11. A process as claimed in claim 1, wherein the fermentation mass is dried at a temperature of between 25 and 30° C.

12. A process as claimed in claim 11, wherein the product is dried with a current of air.

13. A process as claimed in claim 11, wherein the product is dried in vacuo.

14. A composition for the control of eelworm in soil which comprises viable spores of an organism of the class consisting of predacious Moniliaceae supported on vermiculite produced by propagating such an organism in a liquid fermentation medium containing the nutrient essential for the growth of the organism supported on vermiculite and desiccating the resulting product.

References Cited in the file of this patent
UNITED STATES PATENTS

| 1,564,385 | Waksman | Dec. 8, 1925 |
|---|---|---|
| 2,278,236 | Ayres | Mar. 31, 1942 |
| 2,352,168 | Christensen | June 27, 1944 |
| 2,454,753 | Hager | Nov. 23, 1948 |
| 2,843,527 | Rhodes et al. | July 15, 1958 |

OTHER REFERENCES

Chemical and Engineering News, Dec. 22, 1958, page 15.